US006487202B1

(12) United States Patent
Klausmeier et al.

(10) Patent No.: US 6,487,202 B1
(45) Date of Patent: *Nov. 26, 2002

(54) METHOD AND APPARATUS FOR MAXIMIZING MEMORY THROUGHPUT

(75) Inventors: Daniel E. Klausmeier, Sunnyvale; Kevin Wong, San Jose, both of CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,999

(22) Filed: Jun. 30, 1997

(51) Int. Cl.[7] ............................................. H04L 12/28
(52) U.S. Cl. ....................................... 370/395; 370/233
(58) Field of Search ............................... 370/233, 235, 370/395, 397, 399, 398, 409, 412, 465, 468

(56) References Cited

U.S. PATENT DOCUMENTS

| 4,430,712 A | 2/1984 | Coulson et al. |
| 4,543,626 A | 9/1985 | Bean et al. |
| 4,849,968 A | 7/1989 | Turner |
| 4,894,797 A | 1/1990 | Walp |
| 4,991,172 A | 2/1991 | Cidon et al. |
| 5,014,265 A | 5/1991 | Hahne et al. |
| 5,083,369 A | 1/1992 | Syobatake et al. |
| 5,121,383 A | 6/1992 | Golestani |
| 5,136,582 A | 8/1992 | Firoozmand |
| 5,157,654 A | 10/1992 | Cisneros |

(List continued on next page.)

FOREIGN PATENT DOCUMENTS

EP 706298 A2 4/1996

OTHER PUBLICATIONS

Massoud R. Hashemi, Alberto Leon–Garcia, "A General Purpose Cell Sequencer/Scheduler For ATM Switches", ©1997 IEEE, pp. 29–37, Department of Electrical and Computer Engineering, University of Toronto.

(List continued on next page.)

Primary Examiner—Joe H. Cheng
Assistant Examiner—Kim T. Nguyen
(74) Attorney, Agent, or Firm—Blakely, Sokoloff, Taylor & Zafman LLP

(57) ABSTRACT

A method of executing a sequence of multiple dependent operations, each operation including a memory read and a memory write involves overlapping memory accesses of the operations by grouping together memory reads and memory writes of multiple operations and preserving a desired sequence of the operations using a circuit external to a memory through which the memory accesses are performed. The operations may be updates to one or more linked lists. In one embodiment, the step of overlapping memory accesses may be performed by grouping together memory accesses according to ATM cell arrivals or departures. In this embodiment, the operations are associated with ATM cell arrivals or departures and may be gets or puts. Each get and put operation may be characterized by a number of atomic memory operations to update one or more linked lists. To perform the operations a circuit a having an address processor, a data processor coupled to the address processor and to the external memory, and a prefetch buffer coupled to the external memory, the address processor and to the data processor is provided. The address processor generates memory addresses for the operations according to the step of overlapping memory accesses. The atomic memory operations are grouped so that all of the memory read operations associated with the dependent operations are performed before all of the memory write operations associated with the dependent operations are performed.

32 Claims, 7 Drawing Sheets

U.S. PATENT DOCUMENTS

| | | |
|---|---|---|
| 5,214,639 A | 5/1993 | Henrion |
| 5,214,642 A | 5/1993 | Kunimoto et al. |
| 5,224,099 A | 6/1993 | Corbalis et al. |
| 5,247,626 A | 9/1993 | Firoozmand |
| 5,271,002 A | 12/1993 | Barri et al. |
| 5,274,768 A | 12/1993 | Traw et al. |
| 5,278,828 A | 1/1994 | Chao |
| 5,297,137 A | 3/1994 | Ofek et al. |
| 5,301,192 A | 4/1994 | Henrion |
| 5,303,078 A | 4/1994 | Brackett et al. |
| 5,311,509 A | 5/1994 | Heddes et al. |
| 5,313,454 A | 5/1994 | Bustini et al. |
| 5,313,582 A | 5/1994 | Hendel et al. |
| 5,315,707 A | 5/1994 | Seaman et al. |
| 5,359,592 A | 10/1994 | Corbalis et al. ............... 370/17 |
| 5,379,297 A | 1/1995 | Glover et al. |
| 5,404,550 A | 4/1995 | Horst |
| 5,412,655 A | 5/1995 | Yamada et al. |
| 5,432,908 A | 7/1995 | Heddes et al. |
| 5,434,848 A | 7/1995 | Chimento, Jr. et al. |
| 5,469,433 A | 11/1995 | McAuley |
| 5,499,238 A | 3/1996 | Shon |
| 5,502,719 A | 3/1996 | Grant et al. |
| 5,502,833 A | 3/1996 | Byrn et al. |
| 5,517,643 A | 5/1996 | Davy |
| 5,528,587 A | 6/1996 | Galand et al. |
| 5,530,698 A | 6/1996 | Kozaki et al. |
| 5,539,899 A | 7/1996 | Huynh et al. |
| 5,541,912 A | 7/1996 | Choudhury et al. |
| 5,541,919 A | 7/1996 | Yong et al. |
| 5,542,068 A | 7/1996 | Peters |
| 5,546,389 A | 8/1996 | Wippenbeck et al. |
| 5,548,587 A | 8/1996 | Bailey et al. |
| 5,550,823 A | 8/1996 | Irie et al. |
| 5,555,264 A | 9/1996 | Sallberg et al. |
| 5,557,604 A | 9/1996 | Usumi et al. ............... 370/253 |
| 5,557,607 A | 9/1996 | Usumi et al. |
| 5,568,477 A | 10/1996 | Galand et al. |
| 5,570,348 A | 10/1996 | Holden |
| 5,570,362 A | 10/1996 | Nishimura |
| 5,584,015 A | 12/1996 | Villete et al. |
| 5,600,820 A | 2/1997 | Johnston |
| 5,617,416 A | 4/1997 | Damien |
| 5,625,625 A | 4/1997 | Oskouy et al. |
| 5,633,861 A | 5/1997 | Hanson et al. |
| 5,680,582 A | 10/1997 | Slayden |
| 5,701,495 A | 12/1997 | Arndt et al. ............... 395/736 |
| 5,704,047 A | 12/1997 | Schneeberger |
| 5,742,606 A | 4/1998 | Iliadis et al. |
| 5,742,765 A | 4/1998 | Wong et al. |
| 5,765,032 A | 6/1998 | Valizadeh |
| 5,768,275 A | 6/1998 | Lincoln et al. |
| 5,793,747 A | 8/1998 | Kline |
| 5,796,735 A | 8/1998 | Miller et al. |
| 5,812,527 A | 9/1998 | Kline et al. ............... 370/232 |
| 5,838,677 A | 11/1998 | Kozaki et al. |
| 5,838,915 A | 11/1998 | Klausmeier et al. |
| 5,844,901 A | 12/1998 | Holden et al. ............... 370/399 |
| 5,850,395 A | 12/1998 | Hauser et al. |
| 5,854,911 A * | 12/1998 | Watkins ..................... 395/383 |
| 5,875,352 A * | 2/1999 | Gentry et al. ............... 395/843 |
| 5,898,688 A | 4/1999 | Norton et al. |
| 5,901,147 A | 5/1999 | Joffe |
| 5,917,828 A | 6/1999 | Thompson |
| 5,970,064 A | 10/1999 | Clark et al. .................. 370/351 |
| 5,974,466 A | 10/1999 | Mizutani et al. |
| 5,978,856 A * | 11/1999 | Jones ......................... 709/301 |
| 5,982,783 A | 11/1999 | Frey et al. |
| 5,999,518 A | 12/1999 | Nattkemper et al. |
| 5,999,533 A | 12/1999 | Peres et al. |
| 6,011,775 A * | 1/2000 | Bonomi et al. ............. 370/230 |
| 6,028,844 A | 2/2000 | Hao et al. |
| 6,034,945 A | 3/2000 | Hughes et al. |
| 6,058,114 A | 5/2000 | Sethuram et al. |
| 6,201,813 B1 | 3/2001 | Klausmeier et al. |

OTHER PUBLICATIONS

H. Jonathan Chao and Donald E. Smith, "Design of Virtual Channel Queue In An ATM Broadband Terminal Adaptor", ©1992 IEEE, INFOCOM '92, p. 294–302.

The IPX Product Family System Description, pp. 1–114 (Stratacom, Inc. 1990).

BPX Multi–Service ATM Brochure (Stratacom, Inc. 1994).

B. Phillips, "Data Transmission and Switching," Data Communications, pp. 43–45 (McGraw Hill Jan. 1994).

C.M. Chen and N. Roussopoulos, "The Implementation and Performance Evaluation of the ADMS Query Optimizer: Integrating Query Resul Caching and Matching," Lecture Notes in Computer Science, Advances in Database Technology –EDBT '94, pp. 323–336 Cambridge, United Kingdom (Mar. 1994).

"Multi–Access First–In–First–Out Queue Using 370 Compare and Swap," IBM Technical Disclosure Bulletin, vol. 36, No. 2, pp. 327–330 (Feb. 1993).

Kawahara, et al., "Performance Evaluation of Selective Cell Discard Schemes in ATM Networks," IEEE Infocom '96: The Conference on Computer Communications, vol. 3, pp. 1054–1061, Mar. 24–28, 1996.

Vumiokamatani, et al., "Dynamic Threshold Control for Shared Buffer ATM Switching," Shingaku Giho, Technical Report of IECE, SSE95–12, PTO 98–3836, pp. 1–20, May 1995.

The ATM Forum Technical Committee, "Traffic Management Specification Version 4.0,"ATM Forum document number af–tm–0056.000, Apr. 1996.

The ATM Forum Technical Committee, "Addendum to Traffic Management V4.0 for ABR parameter negotiation," ATM Forum document number af–tm–007.000, Jan. 1997.

* cited by examiner

METHOD AND APPARATUS FOR MAXIMIZING MEMORY THROUGHPUT

RELATED APPLICATIONS

This application is related to the following co-pending applications, each assigned to the Assignee of the present application:

Application Ser. No. 09/774,335, filed Jan. 30, 2001, entitled Method and Apparatus for Using ATM Queues for Segmentation and Reassembly of Data Frames, by Daniel E. Klausmeier, Kevin Wong, and David A. Hughes, which is a continuation of Application Ser. No. 08/884,705, filed Jun. 30, 1997, entitled Method and Apparatus for Using ATM Queues for Segmentation and Reassembly of Data Frames, by Daniel E. Klausmeier, Kevin Wong, and David A. Hughes, which issued as U.S. Pat. No. 6,201,813 on Mar. 13, 2001.

Application Ser. No. 08/972,153, filed Nov. 17, 1997, entitled System for Buffering Data in the Network Having A Linked List for Each of Said Plurality of Queues, by Daniel E. Klausmeier and Satish P. Sathe, which issued as U.S. Pat. No. 5,838,915 on Nov. 17, 1998, which is a continuation of Application No. 08/493,666, filed Jun. 21, 1995, entitled Method and Apparatus for Queuing Data in a Digital Network, by Daniel E. Klausmeier and Satish P. Sathe, now abandoned.

FIELD OF THE INVENTION

The present invention relates to a method and apparatus for handling information sent through a digital network and, more specifically, to a method and apparatus for managing queues of cells transmitted through a digital switch.

BACKGROUND OF THE INVENTION

Asynchronous Transfer Mode (ATM) or "cell switching" is a method of transmitting digital information wherein the information is broken into equal sized units called "cells." The individual cells of information are transmitted from a source node to a destination node through a "connection". A connection is a pathway through a digital network. A digital network is constructed of digital switches coupled together by digital communication links.

Each cell originates at a source node and is transmitted across the communication links. The communication links carry the cells of information between the digital switches along the connection pathway. The digital switches route the cells from incoming communication links to outgoing communication links and finally to a destination node.

Each digital switch can be connected to several communication links. Furthermore, each communication link can carry several different connections simultaneously. Typically, a cell memory or buffer is used for temporarily holding cells prior to transmission on a communication link. The cell memory is arranged into logical queues. Several queues may be used for separating different types of services and connections. For example, cells belonging to higher priority connections may be stored in queues that have a higher priority of service. In some cases, a separate queue may be assigned to each connection. Servicing a queue entails removing a cell from the queue and sending the cell out on a communication link or to a destination node coupled to the digital switch. A service algorithm is employed to select a queue for service. To fully utilize the bandwidth of a communication link a cell should be selected for service during each service time.

The buffer of each digital switch must be able to store cells for each of the connections of the switch. Efficient management of the cell-storing function is important. For example, incoming cells must be stored at least as fast as they arrive. Furthermore, once it has been determined that cells from a particular queue should be transmitted into the digital network, the time it takes to determine where the appropriate cells are stored in the buffer, and to retrieve the cells from the buffer, should be minimal. While the sequence of cells that correspond to different connections may be altered during the buffering process, the cells within each connection must be transmitted in the same order as they are received with respect to each other.

To facilitate the required management operations, linked lists are typically used to keep track of the location and sequence of the cells stored in the cell memory. That is, a series of "next entry" pointers are established such that each sequence of entries a are linked together. A queue manager typically maintains the links in the queue so that entries (i.e., pointers) in the linked list correspond to the location of cells in the cell memory. The order of entries in each linked list in the queue indicates the order in which the cells in the corresponding blocks in the cell memory were received.

The queue manager may maintain various queues to keep track of the location of the cells that are stored within the cell memory. For example, queues indicating free blocks of memory will likely be required. In order for these queues to reflect the current state of the cell memory, the queue manager must be informed every time a cell is stored in the cell memory and every time a cell is to be transmitted from the cell memory. The various maintenance procedures performed by the queue manager each typically require a number of "read" and "write" operations to the memory unit or units storing the linked lists of pointers.

For example, consider the case where a new cell is added to the cell memory (i.e., a cell arrival event). In general, receiving a cell consists of removing a memory block from the beginning or head of a free block queue (i.e., a queue of unused memory locations in the cell memory), storing the cell in the block, and adding the block to the end or tail of the queue that corresponds to the connection or class of service associated with the received cell. The queue manager may perform this process in response to a signal that indicates the arrival of the new cell and identifies the connection/class of service with which the new cell is associated. The queue manager determines which block of the cell memory is at the head of the free block queue (e.g., by inspecting a pointer of the head record associated with the free block list). Then, the incoming cell is stored in the block in the cell memory at the head of the free block queue (the "receiving block"). Once the cell has been stored, the queue manager must remove the receiving block from the free block queue and add the receiving block to the tail of the queue that corresponds to the connection associated with the cell. Thus, each cell arrival requires various memory read operations (to obtain the receiving block) and memory write operations (to update the free block list and the connection queue) to the memory unit storing the linked lists of pointers.

Similarly, transmitting a cell (i.e., a cell departure event) involves several read and write operations. In general, transmitting a cell includes sending the cell that is stored in the memory block that resides at the head of a designated queue, removing the block from the head of the queue, and adding the block to the tail of the free list queue. The queue manager may initiate this process in response to a signal from a service controller that identifies the connection onto which a cell is to be transmitted (the "designated connection"). The queue manager determines which memory block of the cell memory is at the head of the queue for the designated connection (e.g., by inspecting a pointer of the head record associated with the designated connection). The cell that is stored in the block in the cell memory at the head of the queue for the designated connection (the "source block") is then trarsmitted. Once the cell has been transmitted from the source block, the queue manager must perform two queue management tasks. First, the source block must be removed from the queue for the designated connection. Second, the source block must be added to the tail of the free block queue.

Because digital switches may have thousands of associated logical connections, the linked lists of pointers described above are typically very large. Accordingly, these linked lists are generally stored in a memory unit (e.g., a random access memory or RAM) external to the queue manager. A bidirectional data bus will couple the queue manager to the external memory unit and the linked list entries will be passed between these units across the data bus. Unfortunately, however, such a system presents a bottleneck. As the speed of the switch throughput increases, the number of individual memory transactions (reads or writes) which occur across the data bus to continually update the linked lists of pointers as cells are serviced also increases. Such a system wastes the available bandwidth of the data bus coupling the memory unit to the queue manager (which is often better utilized in burst transactions where multiple reads or writes are pipelined together) and provides a limiting factor to the overall switch throughput Accordingly, what is needed is a means to accommodate increased throughput in such a digital switch.

SUMMARY OF THE INVENTION

It is an object of the invention to accommodate increased throughput in a digital switch.

It is a farther object of the present invention to provide a method of managing linked lists of pointers for ATM cell queues.

In one embodiment, the present invention provides a method of executing a sequence of multiple dependent operations, each operation including a memory read and a memory write. The method involves overlapping memory accesses of the operations by grouping together memory reads and memory writes of multiple operations; and preserving a desired sequence of the operations using a circuit external to a memory through which the memory accesses are performed. The operations may be updates to one or more linked lists.

In one embodiment, the step of overlapping memory accesses may be performed by grouping together memory accesses according to ATM cell arrivals or departures. In this embodiment, the operations are associated with ATM cell arrivals or departures and may be gets or puts. Each get and put operation may be characterized by a number of atomic memory operations to update one or more linked lists.

To perform the operations in the manner described above, one embodiment of the present invention includes a circuit having an address processor, a data processor coupled to the address processor and to the external memory, and a prefetch buffer coupled to the external memory, the address processor and to the data processor. The address processor generates memory addresses for the operations according to the step of overlapping memory accesses. The atomic memory operations are grouped so that all of the memory read operations associated with the dependent operations are performed before all of the memory write operations associated with the dependent operations are performed.

Other features and advantages of the present invention will be recognized after reviewing the detailed description of selected illustrative embodiments below.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Methods and apparatus for implementing a linked list cache for a digital communication system are disclosed herein. Although discussed with reference to certain illustrated embodiments, upon review of this Specification, those skilled in the art will recognize that the present invention may find application in a variety of systems wherein a sequence of multiple dependent operations, each involving one or more memory reads and/or writes, are desired to be performed in a manner which may improve overall system throughput by reducing latency due to memory bus turn around time between transactions. Therefore, in the following description the illustrated embodiments should be regarded as illustrative only and should not be deemed to limit the scope of the present invention.

Figure 1:
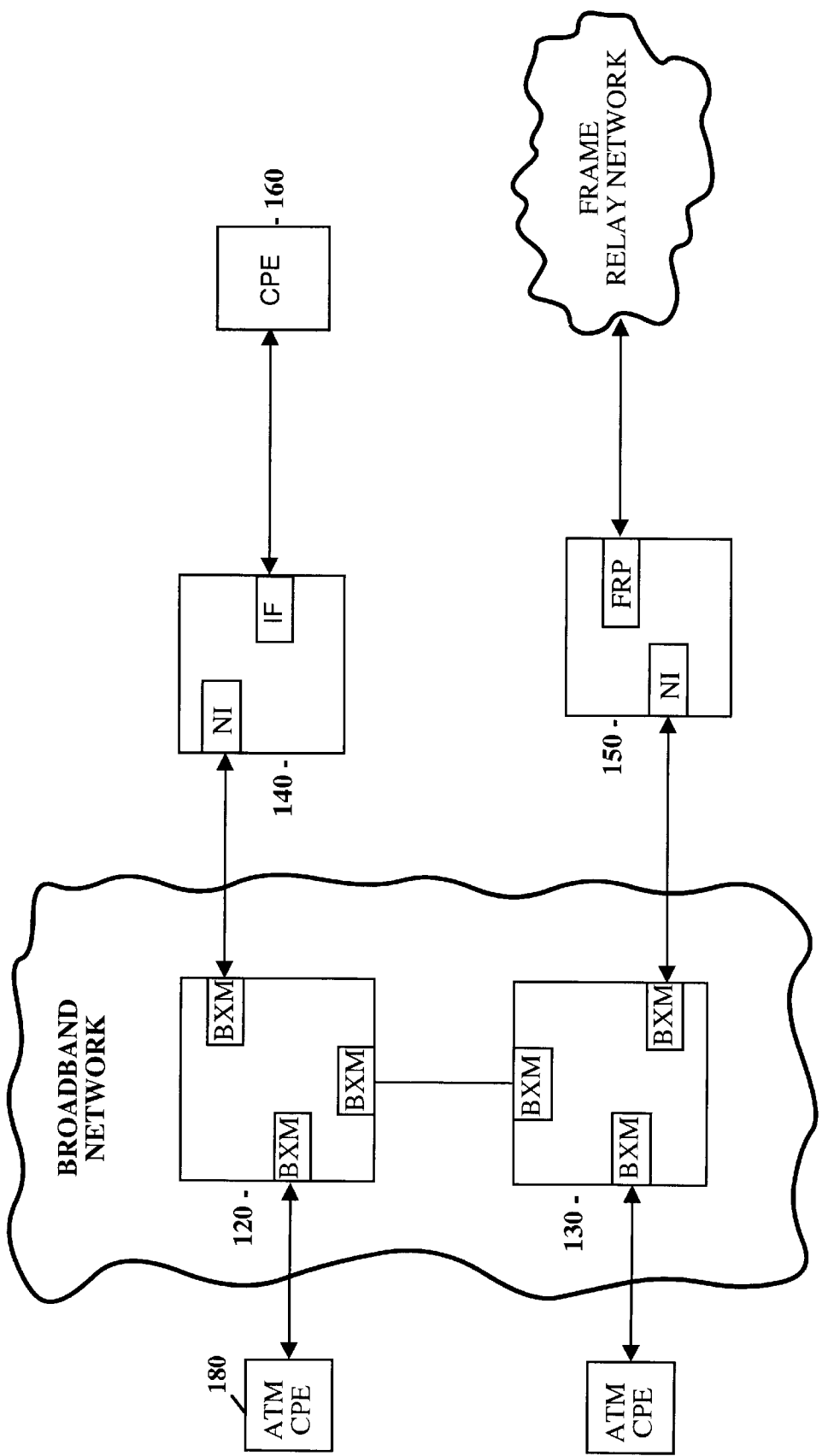
FIG. 1 illustrates a digital communication network constructed with digital switches.

FIG. 1 illustrates a digital communications network. The network illustrated in FIG. 1 is a cell switched digital communication network constructed of digital switches that are capable of building virtual circuits for routing cells. Switches 120 and 130 serve as the backbone for a broadband digital Wide Area Network (WAN). Switches 140 and 150 couple smaller narrowband digital communication links to the broadband digital network.

Each digital switch 120 and 130 is coupled to one or more broadband digital communication links. Examples of broadband digital communication links include E3 lines, T3 lines, OC3 lines and OC12 lines. The digital switches 120 and 130 are also coupled to digital switches 140 and 150 using broadband digital communication links.

Each digital switch 140 and 150 in FIG. 1 is used to couple slower digital communication links to the broadband digital communication network. The customer premise equipment (CPE) 160 may consist of any type of digital communication equipment such a Private Branch Exchange (PBX) or a packet router.

Each digital switch 120 and 130 includes one or more broadband switch modules (BXMs). The BXMs in each digital switch 120 and 130 can be used to directly connect a digital switch (e.g., digital switch 120) to any customer premise equipment (CPE) 180 that uses asynchronous transfer mode (ATM) communications and supports the proper interface. In one embodiment, an OC3 based communication link is used to carry the information. The BXMs may also support an interface which allows the digital switches 120 and 130 to be connected together via one or more high speed digital communication links.

Figure 2:
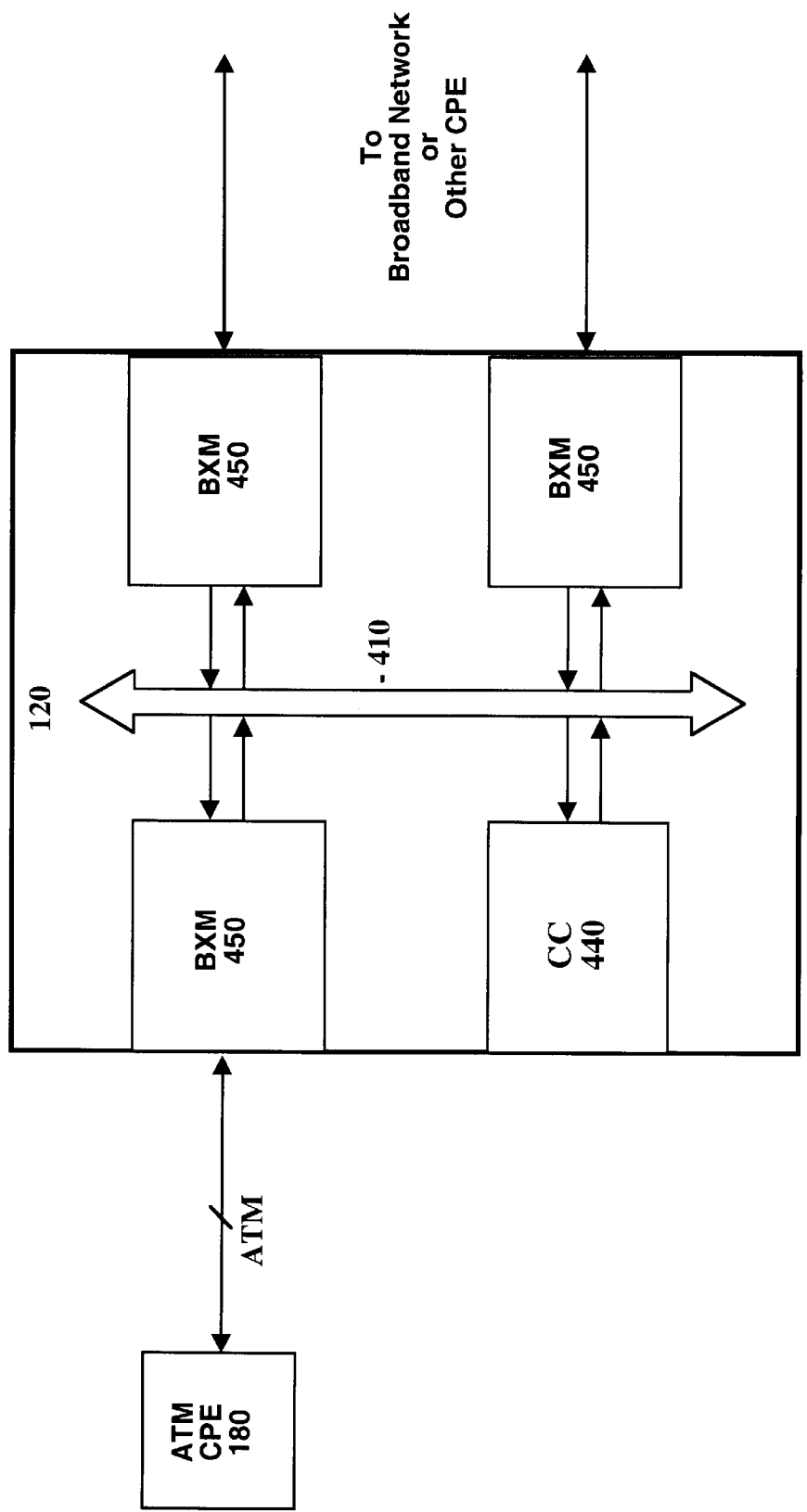
FIG. 2 illustrates an internal block diagram of a digital switch.

FIG. 2 illustrates a block diagram of the internal structure of a digital switch 120. Each digital switch 120 consists of a plurality of BXMs 450 and a Control Card (CC) unit 440. BXMs 450 and CC unit 440 may each comprise one or more cards (e.g., front and back cards) which are housed within switch 120.

Each BXM 450 may include a network interface connected to a digital communication link. Every BXM 450 may also be coupled to a high-speed backplane bus 410 within the digital switch 120.

The CC unit 440 is also coupled to the backplane bus 410. The CC unit 440 contains a digital crossbar switch that routes data cells to and from all the different digital communication links that are coupled to the digital switch 120. In general, cells received from one of the digital communication links at a first of the BXMs 450 are transferred from that BXM to CC unit 440 across high-speed bus 410. CC unit 440 routes those cells to a second BXM 450, again using bus 410. Ultimately, the cells are transmitted out of switch 120 on a digital communication link coupled to the second BXM.

Figure 3:
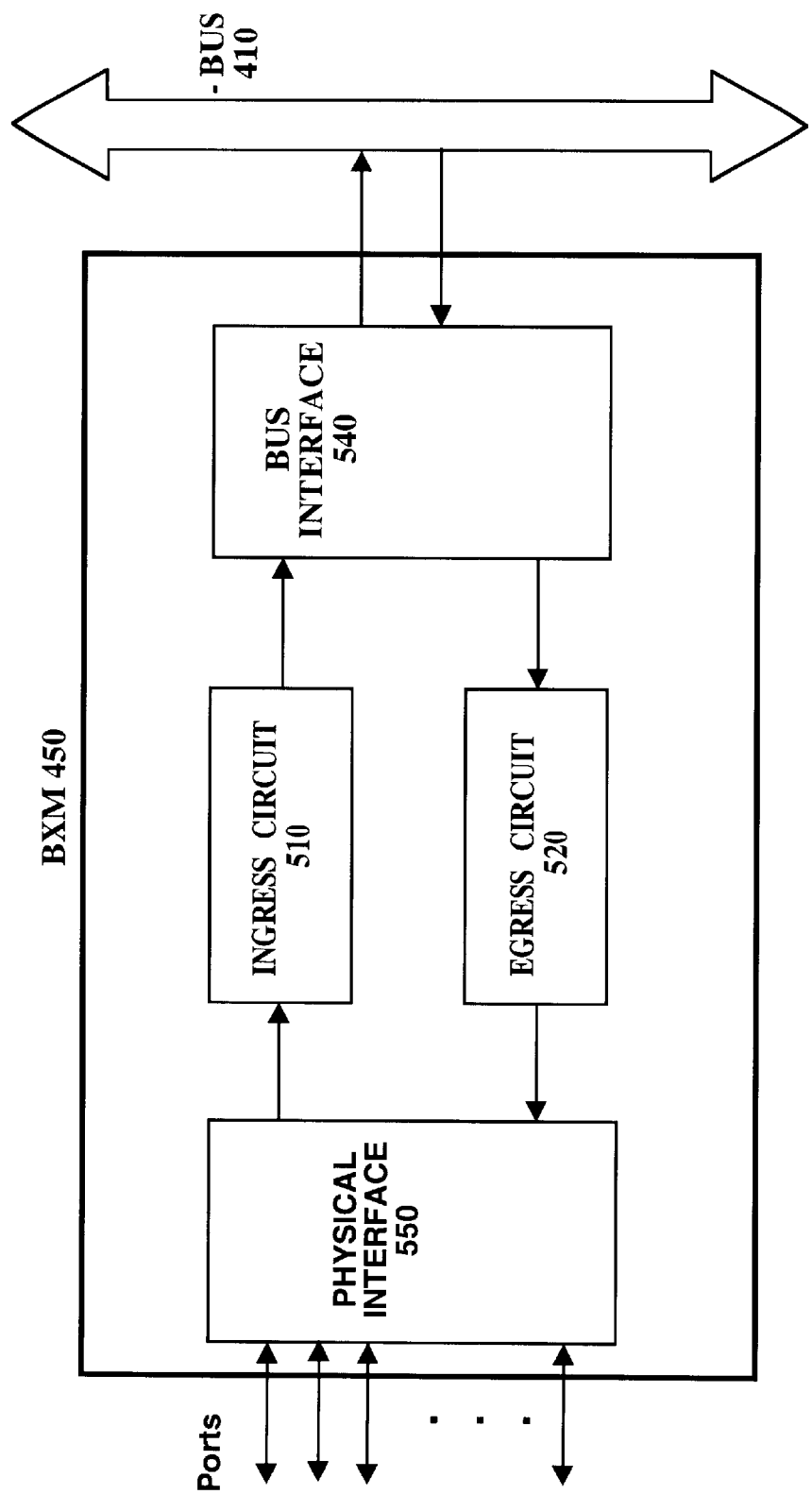
FIG. 3 illustrates an internal block diagram of a broadband switch module (BXM) of a digital switch.

FIG. 3 illustrates an internal block diagram of a BXM 450. The BXM 450 includes an ingress circuit 510, an egress circuit 520, a bus interface circuit 540 and a physical interface circuit 550. The ingress circuit 510 processes incoming cells received from one of the digital communications links through physical interface circuit 550. The egress circuit 520 processes outgoing data cells received from bus interface circuit 540. Ingress circuit 510 and egress circuit 520 may be substantially similar in design. The bus interface circuit 540 is coupled to both the ingress circuit 510 and the egress circuit 520 and distributes data cells to and from the high speed bus 410 within the digital switch 120. The physical interface circuit 550 is also coupled to the ingress circuit 510 and the egress circuit 520 and distributes cells to and from the digital communication links coupled to the physical interface circuit 550 through one or more ports.

Figure 4:
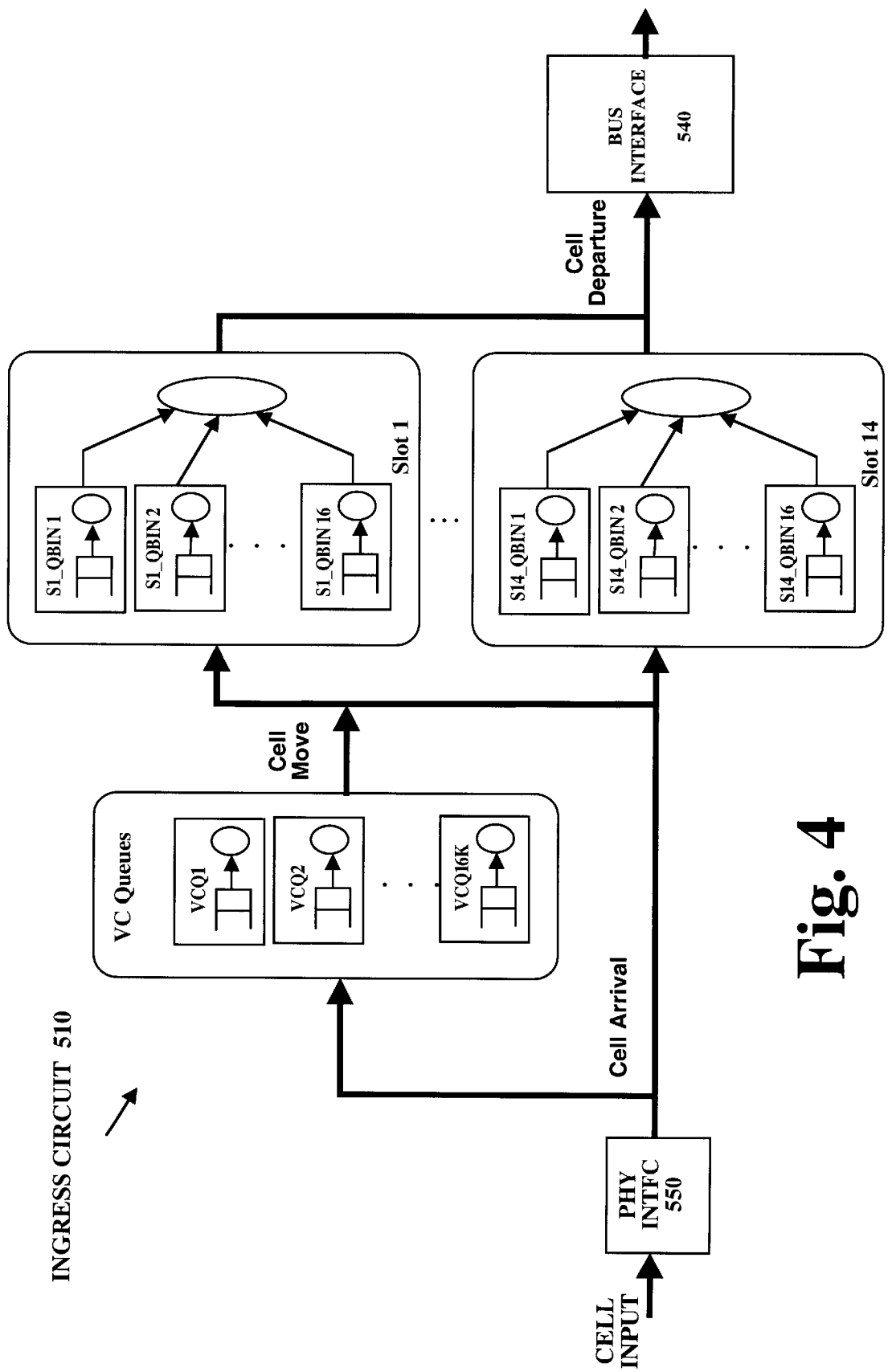
FIG. 4 is a functional representation of an ingress circuit in a broadband by switch module (BXM)

FIG. 4 illustrates the functional components of ingress circuit 510. Hereafter, the description is generally directed to ingress circuit 510, however, it should be appreciated that egress circuit 520 is substantially similar. For ingress circuit 510, cells are received from an ATM communication link through one or more ports of physical interface 550 and are passed to bus interface circuit 540 to be transmitted over bus 410 and, ultimately, into the digital network. Those skilled in the art will appreciate that other functional elements which may be present as part of ingress circuit 510 (such as traffic policing circuits) have not been illustrated so as not to unnecessarily complicate the illustration.

For ingress circuit 510, incoming cells are placed into a queue in a cell memory until the cell is serviced. Ingress circuit 510 maintains various cell queues, including VC queues that correspond to individual connections and QBin queues that correspond to various classes of service. These queues may be implemented through special memory components, such as FIFOs. However, such an implementation would be expensive and inflexible. For example, a cell memory that supports a thousand connections would require a thousand separate queue-implementing memory components for just the VC queues. Furthermore, it would be difficult for VC queues that correspond to connections with heavy traffic to "borrow" memory from VC queues that correspond to connections with light or no traffic. Consequently, the present embodiment stores incoming cells in separate dynamic random access memory (DRAM), and implements the various queues through the use of linked lists.

The manner in which such linked list queues are implemented and controlled is discussed in detail below. Briefly, as cells are received at switch 120, they are temporarily stored in a cell memory prior to transmission across the backplane to one of the outgoing communication links. A linked list data base is used to keep track of the location and sequence of the cells in the cell memory. That is, a series of "next entry" pointers are established such that each sequence of entries are linked together. Each connection and class of service supported by switch 120 has a corresponding linked list queue (VC queue or QBin queue, respectively) and a queue manager maintains the links in each of the queues so that the entries (i.e., pointers) in the linked lists are updated to reflect cell arrivals (to VC or QBin queues), cell moves (from a VC queue to a QBin queue) and cell departures (from a QBin queue).

VC queues are implemented to support ABR traffic according to various specifications adopted and proposed by the ATM Forum. Specifically, for ABR VSVD (virtual source virtual destination) connections (as defined in the ATM Forum's "Traffic Management Specification v4.0", March 1996, and its later revisions), the cells are first enqueued in a VC queue and then moved to a QBin queue for servicing at a rate depending upon the dynamics of the available network bandwidth. Other network traffic is received directly into QBin queues for servicing.

The QBins are organized as QBin groups (QBGs). Each QBG is made up of a number of QBins, each with its own associated service priority. In one embodiment, 32 QBGs are supported, each with 16 QBins.

As indicated above, switch 120 supports a number of interface cards. These cards are housed in slots in the switch 120 and each card supports a number of ports. During cell ingress, QBGs are mapped to an appropriate destination slot, i.e., to a card which supports the port that the cell is to be transmitted out on. During cell egress, QBGs are mapped to physical ports. To accomplish these tasks in accordance with the above-described service algorithm, a Queue Controller includes selection logic for selecting the next eligible QBG and QBin for service.

As indicated above, some cells are enqueued in VC queues prior to being moved to QBins for servicing. A Service Controller determines when cells will be moved from a VC queue to a QBin. To accomplish this task, the Service Controller transmits a signal to the Queue Controller to indicate that a cell should be moved. The signal identifies the source VC queue which is subsequently mapped to an appropriate destination QBin. In response, the Queue Controller updates the linked lists so that the pointers which indicate the memory location of cell being moved are removed from the bead of the designated VC queue and are added to the tail of the appropriate QBin queue.

Figure 5:
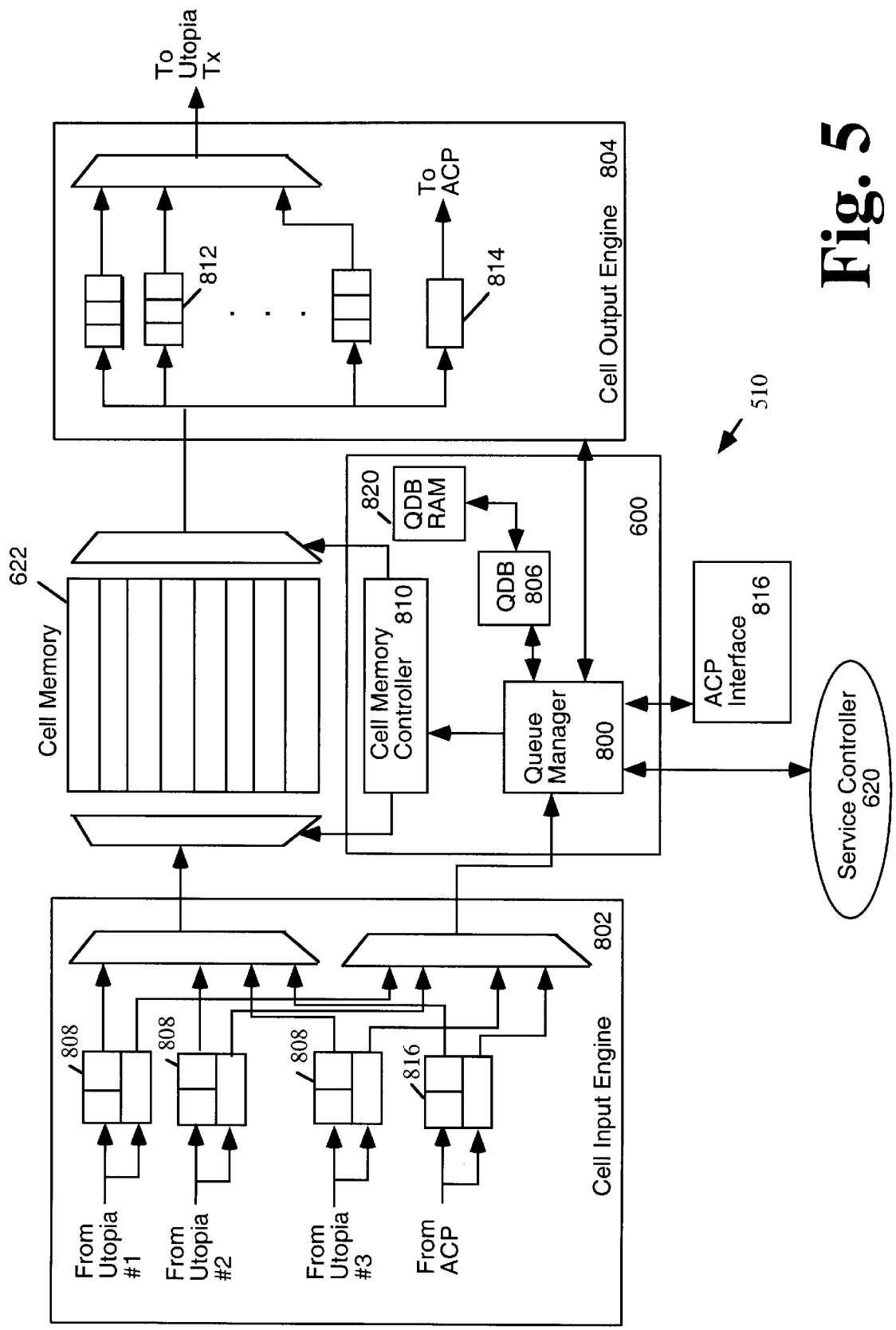
FIG. 5 illustrates an internal block diagram of a queue controller for the ingress circuit shown in FIG. 4.

FIG. 5 illustrates a block diagram of the structure of ingress circuit 510 according to one embodiment of the present invention. Ingress circuit 510 includes Queue Controller 600, cell input engine 802 and cell output engine 804.

Queue Controller 600 includes a queue manager 800 and a cell memory controller 810. Queue manager 800 keeps track of the location and sequence of the cels stored in cell memory 622 through the use of linked lists. The linked lists are stored in a queue data base random access memory (QDB RAM) 820 and managed through the use of queue data base controller (QDB) 806. Because of the number of connections supported by switch 120, a separate (i.e., off chip) QDB RAM 820 is used. In one embodiment, QDB RAM 820 is a synchronous SRAM. Also shown in FIG. 5 is off chip cell memory 622 which is used to store the actual cells as described above.

Cell Input Engine (CIE) 802 is responsible for receiving incoming cells from M1 three Utopia-2 receive interfaces. The receive interfaces may be associated with three ATM communication links (in the case of ingress circuit 510) or bus 410 (in the case of egress circuit 520). In either case, port or bus interface circuits (not shown) which comply with the well known Utopia-2 standard for carrying ATM cells between devices provide the cells to each of the Utopia-2 receive interfaces. CIE 802 converts 16-bit Utopia-2 data into 64-bit data for storage in cell memory 622 and stores the cells to three separate queues 808. To allow a local processor (ACP) to inject cells into the cell stream (e.g., OAM cells or signaling channels), an additional cell queue 816 is reserved for the ACP. However, in a preferred embodiment the ACP cell queue 816 will only be serviced when there is a "hole" in one of the other 3 cell streams, i.e., there is no dedicated bandwidth for an ACP to inject cells. To prevent the ACP from being starved, priority access is given to the ACP cell queue 816 every 128 cell tics (a cell tic used to synchronize data flow through the Queue Controller 600 and up to one cell may be received during a cell tic).

CE 802 implements a queue depth of 2 for the Utopia-2 receive interfaces. This allows CIE 802 to receive one cell per port every cell tic, provided that the to previous cell is granted service when the tic arrived. If the previous cell has been granted service at the cell tic, CIE 802 checks its Utopia-2 receive interface and starts He receiving a new cell if a cell is available. Note that all three ports function independently and they can receive cells in parallel. After CIE 802 receives a cell, it extracts the cell's connection, source and other information, and presents the information to queue manager 800 for processing. Queue manager 800 reviews the CIE 802 cell arrival queuing requests and informs the QDB 806 which queue to place the cell in. The actual data transfer from the CE 802 cell queues 808 to cell memory 622 is performed by cell memory controller (CMC) 810.

Cell output engine (COE) 804 is responsible for handling departing cells and in one embodiment may include 16 output queues 812, each 5-cells deep, one for each Utopia-2 device (port or slot) supported by switch 120. For departing traffic, CMC 810 loads cells into the COE output queues 812. Connection information from the departing cell is extracted and provided to queue manager 800. Queue manager 800 updates the connection statistics and provides COE 804 with VCI, VPI, and EFCI update information for the departing cell.

COE 804 constantly polls the 16 Utopia-2 transmit slots in a round-robin fashion. If appropriate, COE 804 retrieves a cell from an output queue 812 and transmits the cell at the next cell tic. While the cell is being transmitted, COE 804 begins poling starting at the next sequential port address. Polling stops when a port is identified to receive a cell at the next cell tic or when all the ports have been polled in the current cell tic. Polling resumes at the next cell tic.

When there is a cell to be sent to the ACP, the CMC 810 retrieves the cell and sends it to an ACP cell queue 814 in COE 804. COE 804 then sets a status bit, indicating that a cell is available for reading. The status bit can be configured to cause an interrupt to the ACP which may then read the cell from the ACP cell queue 814.

Figure 6:
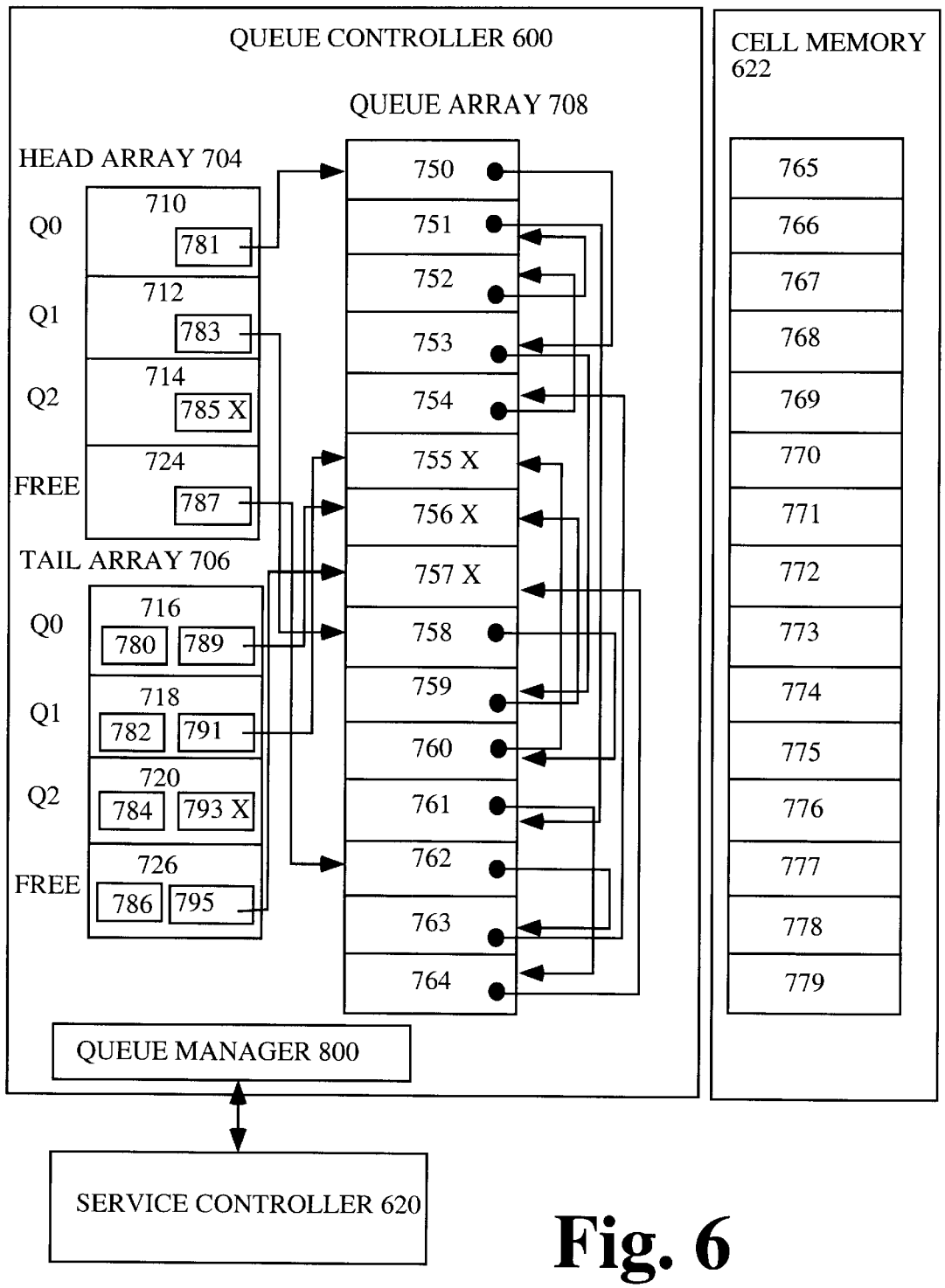
FIG. 6 illustrates a linked list structure for ATM cell queues.

The use of linked lists to keep track of the cells stored in cell memory 622 is described with reference to FIG. 6. For the purposes of explanation, assume that three linked lists are maintained. It should be recognized, however, that the present invention is not limited to any particular number of connections or classes of service.

In addition to queue manager 800, Queue Controller 600 includes a head array 704, a tail array 706 and a queue array 708. Each of these arrays are stored in QDB RAM 820. There is a one-to-one correspondence between the entries 750–764 in queue array 708 and the memory blocks 765–779 located in cell memory 622. For example, entry 750 corresponds to block 765 of cell memory 622, entry 751 corresponds to block 766 of cell memory 622, etc. Each entry in queue array 708 contains a pointer which indicates a "next entry" in queue array 708. Each sequence of queue array entries that are linked together via "next entry" pointers constitutes a linked list. In the illustrated example, entries 750, 753, 759, and 756 are linked together to form a linked list. Entry 756 is illustrated with an "X" rather than a pointer to indicate that the value of its pointer is irrelevant because it is the last entry in the linked list.

Queue manager 800 maintains the links in queue array 708 so that entries in the linked lists correspond to the location of cells associated with a corresponding VC queue or QBin queue. For example, assume that the linked list comprising entries 750, 753, 759 and 756 corresponds to a connection or class of service (associated with a VC queue or QBin queue, respectively) Q0. This would indicate that blocks 765, 768, 774 and 771, which correspond to entries 750, 753, 759, and 756, contain cells that were received on and are to be sent over connection/class of service Q0.

Both head array 704 and tail array 706 contain one record for each connection/class of service supported by BXM 450. Specifically, head array 704 includes head records 710, 712 and 714 which correspond to connections/classes of service Q0, Q1 and Q2, respectively. Similarly, tail array 706 contains tail records 716, 718 and 720 which correspond to connections/classes of service Q0, Q1 and Q2, respectively. Each of the entries in head array 704 and tail array 706 contain a pointer. The records in tail array 706 also contain an "empty" flag. Specifically, head records 710, 712,714 and 724 of head array 706 respectively contain pointers 781, 783,785 and 787. Tail records 716, 718, 720 and 726 of tail array 706 respectively contain pointers 789, 791, 793 and 795, and empty flags 780,782, 784 and 786.

The pointers contained in the head records in head array 704 and the tail records in tail array 706 point to entries of queue array 708. The head record in head array 704 for a given connection/class of service contains a pointer to the head (oldest entry) of the linked list in queue array 708 associated with the connection/class of service. The tail record in tail array 706 for a given connection/class of service contains a pointer to the tail (most recent entry) of the linked list in queue array 708 for the connection/class of service. For example, the entry at the head of the linked list associated with connection/class of service Q0 (i.e., entry 750) is pointed to by the pointer 781 of the head record in head array 704 that corresponds to connection/class of service 0 (i.e., head record 710). Similarly, the entry at the tail of the linked list associated with connection/class of service Q0 (i.e., entry 756) is pointed to by the pointer 789 of the tail record in tail array 706 that corresponds to connection/class of service Q0 (i.e., tail record 716).

Queue Controller 600 also keeps track of the blocks within cell memory 622 that are available for storing new cells. Consequently, in addition to having a linked list for every connection/class of service, queue array 708 contains a linked list that indicates the free blocks in cell memory 622. In addition to containing one record for each of connections/classes of service Q0, Q1 and Q2, head array 704 and tail array 706 each have one record for keeping track of the free blocks in cell memory 622. In the illustrated example, head record 724 in head array 704 and tail record 726 in tail array 706 are provided to track the linked list in queue array 708 that is associated with the free blocks in cell memory 622. In a preferred embodiment, Queue Controller 600 maintains head record 724 and tail record 726 on chip (i.e., in one or more on chip registers, not in QDB RAM 820) so that the number of external memory accesses is reduced.

In order for head array 704, tail array 706 and queue array 708 to reflect the current state of cell memory 622, Queue Controller 600 should be informed every time a cell is stored in cell memory 622 (cell arrival event) and every time a cell is to be transmitted from cell memory 622 (cell departure event). In addition, the above-discussed arrays must be updated for each cell move event (a cell move occurs when a cell is moved from a VC queue to a QBin queue—in fact, the cell is not physically moved with cell memory 622, however, various linked list pointers for each queue involved in the move event must be updated). Such updating requires a number of atomic memory operations for each cell event.

For example, when a new cell is added to the cell memory 622 (i.e., a cell arrival event) Queue Controller 600 determines which memory block of the cell memory 622 is at the head of the free block queue. Then, the incoming cell is stored in the block in the cell memory 622 at the head of the free block queue (the "receiving block"). Once the cell has been stored, Queue Controller 600 removes the receiving block from the free block queue and adds the receiving block to the tail of the queue that corresponds to the connection/class of service associated with the arriving cell.

Similarly, transmitting a cell (i.e., a cell departure event) involves several read and write operations. Queue Controller 600 determines which memory block of the cell memory 622 is at the head of the queue for the designated connection/class of service. The cell that is stored in the block in the cell memory 622 at the head of the queue for the designated connection/class of service (the "source block") is then transmitted. Once the cell has been transmitted from the source block, Queue Controller 600 performs two queue management tasks. First, the source block is removed from the queue for the designated connection/class of service. Second, the source block is added to the tail of the free block queue.

Figure 7:
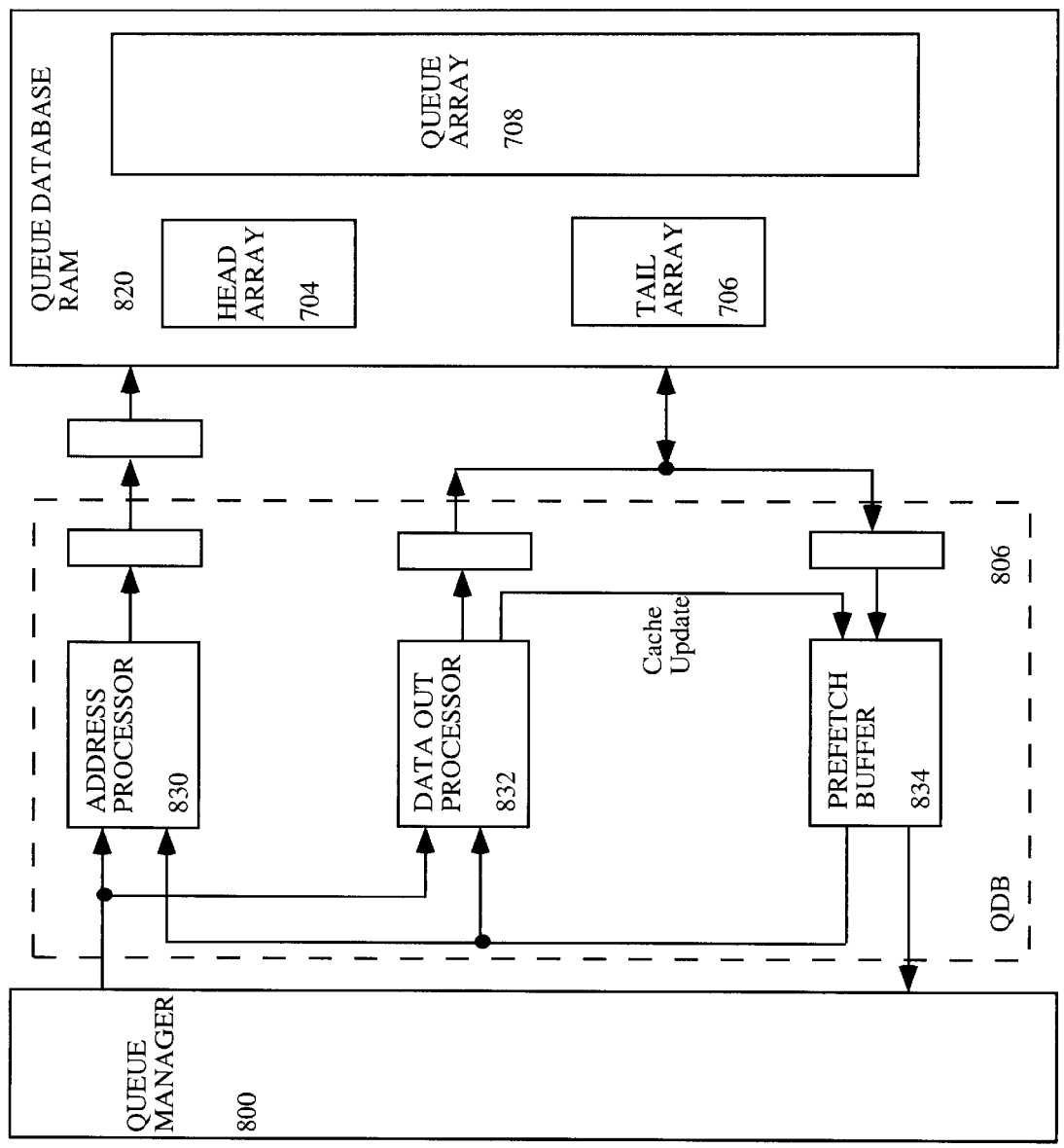
FIG. 7 illustrates a block diagram of a queue data base according to one embodiment of the present invention.

Because an off chip SRAM (QDB RAM 820) is used to store head array 704, tail array 706 and queue array 708 (due to the large number of total connections/classes of service supported), each of these queue management operations requires a number of memory bus transactions. These transactions present a limiting factor for overall switch throughput To improve throughput, the present invention provides queue database controller (QDB) 806, as shown in FIG. 7, with a caching circuit wherein a number of atomic memory operations can be performed and the updated information transferred to QDB RAM 820 as a burst transaction. Using the caching circuit, each of the atomic operations required as part of the queue management task can be performed without having to continuously transfer information between the Queue Controller 600 and the QDB RAM 820. The queue data base controller (QDB) 806 and the caching process are described further below.

To appreciate the architecture of the QDB 806 and the caching process, it is helpful to understand the types of cell events that are accommodated (i.e., cell arrivals, departures and moves). Next, the logical order of operations to be performed for each event must be recognized. Finally, the order in which each of the operations is implemented to reduce the number of memory access required can be described.

As discussed above, three types of cell events are accommodated: cell arrivals, cell departures and cell moves. Cell arrivals correspond to the receipt of a cell to the tail of an associated queue (VC queue or QBin queue). Cell departures correspond to the transmission of a cell from the head of a QBin queue. Cell moves correspond to the passing of a cell from the head of a VC queue to the tail of a QBin queue. Up to three cell arrivals, two cell departures and one cell move may be accommodated during each cell tic.

Two basic types of operations are performed by Queue Controller 600 for each cell event: gets and puts. Gets and puts define the external SRAM accesses made by QDB 806 to QDB RAM 820 during a cell event Each get and put operation entails a number of atomic memory operations (i.e., reads and writes from/to QDB RAM 820 which stores the head array 704, tail array 706 and queue array, i.e., linked list array, 708), depending on whether it is a queue linked list or the free list which is being accessed/updated. The details of the get and put operations are easily described using pseudo code as follows (note, in the following QN=queue number, BN=block number):

```
get from a queue: get(ON)

CHBN = HeadArray[QN];        /*read current head pointer from memory*/
CTBN = TailArray[QN];        /*read current tail pointer from memory*/
If(CTBN.empty_bit = 1)       /*check to see if the queue is empty*/
    /*do nothing*/
Else if(CHBN ≠ CTBN)         /*queue will not go empty after operation*/
    NHBN = LinkedList[CHBN];     /*read new head pointer from
                                    memory*/
    HeadArray[QN] = NHBN;        /*write head pointer to memory*/
Else                         /*queue will go empty after operation*/
    TailArray[QN] = X, empty;    /*write tail pointer to memory*/
key: CHBN = current head pointer
     CTBN = current tail pointer
     NHBN = new head pointer
     X    = don't care
```

From the above comments, it can be seen that the get(QN) operation requires a total of 4 memory accesses: 3 memory reads and 1 memory write.

--- get from the free list: get(FL)

---

If(FreeListEmpty = 1)                        /*check to see if the queue is empty*/
    /*do nothing*/
Else if(FreeListHead ≠ FreeListTail)   /*queue will not go empty after operation*/
    NFHBN = LinkedList[FreeListHead];   /*read new free list head pointer from external memory*/
    FreeListHead = NFHBN;                /*store free list head pointer in on chip register*/
Else                                        /*queue will go empty after operation*/
    FreeListEmpty = 1;                  /*store free list tail pointer in on chip register*/
key:   NFHBN = new free list head pointer

---

From the above comments, it can be seen that the get(FL) operation requires a total of 1 memory access: a memory read.

--- put to a queue: put(QN,BN)

---

CTBN = TailArray[QN];        /*read current tail pointer from memory*/
TailArray[QN] = BN;          /*write tail pointer to memory*/
If(CTBN.empty_bit = 1)       /*check to see if the queue is empty*/
    HeadArray[QN] = BN;     /*write head pointer to memory*/
Else                         /*queue not empty*/
    LinkedList[CTBN] = BN;  /*write tail link to memory*/

---

From the above comments, it can be seen that the Put (QN,BN) operation requires a total of 3 memory accesses: 1 memory read and 2 memory writes.

--- put to the free list: put(FL,BN)

---

If(FreeListEmpty = 1)                     /*check to see if the queue is empty*/
        FreeListHead = BN;                 /*store head pointer in on chip register*/
    Else                                      /*queue not empty*/
        LinkedList[FreeListTail] = BN;     /*write tail link to external memory*/
    FreeListTail = BN;         /*store tail pointer in on chip register*/
    From the above comments, it can be seen that the put(FL,BN) operation
requires a total of 1 memory accesses: a memory write.
    Now consider a cell arrival event:
        BN = get(FL);    /*determine which block of memory to store the arriving cell at*/
        put(QD,BN);      /*store the cell at the appropriate destination queue*/

--- where, QD=destination queue and replaces the notation QN above.

When a cell arrives, Queue Controller 600 determines which block of the cell memory 622 to store the arriving cell in by performing a get(FL) operation. The head record of the free list (e.g., record 724 in FIG. 6), which is maintained on chip to reduce the number of external memory access required, is examined to obtain a pointer which indicates the first entry in a linked list that is associated with the free blocks in cell memory 622. Using the head record of the free list, QDB 806 obtains the memory address of the free block to which the arriving cell will be stored (i.e., the receiving block). In addition, QDB 806 reads the entry pointed to by the head record of the free list, to get the pointer for the new head of the free block. This will be used to update the head record 724. Thus, Queue Controller 600 executes the get(Fl) operation by performing one external memory read operation.

To complete the cell arrival event, Queue Controller 600 performs a put(QD,BN) operation to the appropriate destination queue associated with the arriving cell. This involves storing the cell at the designated location in cell memory 622 and updating the appropriate queue linked list and the free list. The storing of the cell is carried out by CMC 810. Once the cell has been stored in the cell memory 622, QDB 806 removes the receiving block from the free block queue and adds the receiving block to the tail of the queue that corresponds to the connection/class of service associated with the cell. The tail array record is also updated to point to the receiving block. Thus, the put(QD, BN) operation requires one memory read and two memory writes. In total, the cell arrival event requires two memory reads and two memory writes.

Cell departures also require a number of get and put operations.
  BN=get(QS); /*determine the source queue*/
  put(FL, BN); /*update the free list and the new head of the source queue*/
    where, QS=source queue and replaces the notation QN above.

During a cell departure event, Queue Controller 600 performs a get(QS) operation to determine the cell memory 622 location (the source block) of the cell at the head of the source queue associated with the departing cell. Note that the tail array record is read to determine if the queue is empty. Also, the queue array location indicated by the head record is read to obtain the pointer to the next entry in the linked list (i.e., the new head pointer). This pointer is used to write a new value to the head array record to indicate the cell departure. Thus, the get(QS) operation requires three reads and one write.

Once the cell has been transmitted from the source block, the source block is added to the tail of the free block queue by performing the put(FL, BN) operation. This is a single memory write operation. Thus, a cell departure requires three reads and two writes.

Cell moves may be described as:
BN=get(QS); /*obtain the cell from the head of the source VC queue*/
put(QD, BN); /*transfer the cell to the tail of the designated QBin queue*/

Cell moves require transferring a cell from the head of a source queue to the tail of a destination queue. The get requires three read operations and one write operation (to update the source queue to reflect a new head) as described above. The put requires one read operation (to retrieve the information regarding the current tail of the destination queue) and two write operations (to update the destination queue tail information with the new cell location). Thus, a move requires a total of 7 memory operations.

If a total of three cell arrivals, two cell departures and one cell move are to be accommodated in a single cell tic, then a total of 29 memory operations are required. That is, each cell arrival=2 reads and 2 writes, so three cell arrivals=6 reads and 6 writes (12 total memory operation); each cell departure=3 reads and 2 writes, so two cell departures=6 reads and 4 writes (10 total memory operations); and the cell move=4 reads and 3 writes (7 total memory operations) (12+10+7=29). In addition, a single memory operation (read or write, as required) for the local processor (ACP) should be accommodated within each cell tic. Thus, a total of 30 atomic memory operations are to be supported.

In a currently preferred embodiment, each cell tic corresponds to 34 clock cycles. In an SRAM read operation, data is a valid one cycle after the address while for a write, data and address must be valid on the same cycle. The SRAM requires one "dead" cycle for data bus turn around when switching direction. In order to have the one dead cycle for data bus turn around there must be 2 dead cycles on the address bus when switching from read to write, however, no dead cycles are needed when switching the other way around.

To achieve the 30 read and write operations in one cell tic, QDB 806 performs the read and write operations in an out-of-order fashion. That is, instead of performing each of the operations in its "natural" order (i.e., as described above for each of the get and put operations), QDB 806 applies a preferred order for implementing the necessary read and write accesses from/to QDB RAM 820. With the 2 cycle bus turn around time, this approach requires 32 clock cycles, thus leaving 2 cycles for margin. Accordingly, in the preferred embodiment, QDB 806 performs all the required read operations and then switches over to do all the write operations. For simplicity of design, all the read/write operations are each allocated a fixed slot of the available 34 clock cycles. If a read or write operation is needed, the operation is initiated in its designated time slot; otherwise the slot will be idle. The order implemented in the preferred embodiment is to perform the dequeues followed by the enqueues, as follows:

Get BN for move operation;
Get BN for departure 0;
Get BN for departure 1;
Get free block 0 for arrival 0;
Get free block 1 for arrival 1;
Get free block 2 for arrival 2;
Put BN for move operation;
Put BN for arrival 0;
Put BN for arrival 1;
Put BN for arrival 2;
Put BN to free list for departure 0; and
Put BN to free list for departure 1.

The preferred read/write sequence for QDB 806 memory access is given below in Table 1.

TABLE 1

| Bus Cycle | Memory Accesses |
| --- | --- |
| 1 | get queue for move: read head pointer |
| 2 | put queue for move: read tail pointer |
| 3 | get free block for arrival 0: read free list head |
| 4 | put queue for arrival 0: read tail pointer |
| 5 | put queue for arrival 1: read tail pointer |
| 6 | get queue for departure 0: read head pointer |
| 7 | put queue for arrival 2: read tail pointer |
| 8 | get free block for arrival 1: read free list head |
| 9 | get queue for move: read tail pointer |
| 10 | get queue for departure 0: read tail pointer |
| 11 | get queue for departure 1: read head pointer |
| 12 | get queue for departure 1: read tail pointer |
| 13 | get free block for arrival 2: read free list head |
| 14 | get queue for move: read new head pointer |
| 15 | get queue for departure 0: read new head pointer |
| 16 | get queue for departure 1: read new head pointer |
| 17 | Data Bus turn around |
| 18 | Data Bus turn around |
| 19* | put queue for move: write tail link |
|  | put queue for move: write head pointer |
| 20* | put queue for arrival 0: write tail link |
|  | put queue for arrival 0: write head pointer |
| 21* | put queue for arrival 1: write tail link |
|  | put queue for arrival 1: write head pointer |
| 22* | put queue for arrival 2: write tail link |
|  | put queue for arrival 2: write head pointer |
| 23 | put queue for move: write tail pointer |
| 24 | put queue for arrival 0: write tail pointer |
| 25 | put queue for arrival 1: write tail pointer |
| 26 | put queue for arrival 2: write tail pointer |
| 27* | get queue for move: write head pointer |
|  | get queue for move: write tail pointer |
| 28* | get queue for departure 0: write head pointer |
|  | get queue for departure 0: write tail pointer |
| 29* | get queue for departure 1: write head pointer |
|  | get queue for departure 1: write tail pointer |
| 30 | put free block for departure 0: write free list tail |
| 31 | put free block for departure 1: write free list tail |
| 32 | ACP access (read or write) | key: during bus cycles indicated with a *, only one of the designated operations are performed, depending on whether the queue is determined to be empty or not, as described in the above pseudo code representations.

The above sequence has been mapped out according to the following guidelines:

1. Memory latency leads to sequential dependencies among operations. These are resolved by scheduling an action and its dependent action 5 clock cycles apart, corresponding to the latency of the above-described embodiment. Other embodiments may involve other latencies. For example put operations may require information obtained from a previous get operation. These actions are scheduled at least 5 clock cycles apart to resolve any data or address dependencies.

2. Head pointer dependencies are resolved in read operations. For example, there is a head pointer dependency when cells are moved from and departed from the same queue. The head pointer dependency, caused by cell moves and cell departures from the same queue, should be resolved in read sequencing so that the head pointer and the new head pointer for move and departure requests can have the updated value before the sequence switches from read to write. This means that these operations have to be issued 5 clock cycles apart.

3. Tail pointer dependencies are resolved in write operations. For example, the tail pointer dependency caused by cell arrivals and cell moves to the same queue should be resolved in write sequencing.

4. Head/tail pointer dependencies are resolved in reads and in writes. Head pointer/tail pointer dependency occurs when a cell moves or departs from a queue and cause the queue to become empty and then cells arrive to the same queue and change it to non-empty. Because all of the read operations are done first, followed by all the write operations, the above events can cause head/tail pointer by dependency. This is resolved by checking the empty flag of the tail pointer and the valid bit of the head pointer in the prefetch register file.

5. Time slots are allocated for worst case conditions. They can be used for ACP read/write access if the slot is idle.

Queue data base controller (QDB) 806 is further discussed with reference to FIG. 7. QDB 806 includes an address processor 830, a data out processor 832 and a prefetch buffer 834. Address processor 830 receives requests from queue manager 800 and generates the read/write addresses for QDB RAM 820 read/write operations. Data out processor 832 generates the data (e.g., the updated pointers) that are to be written to the QDB RAM 820.

Prefetch buffer 834 is a register file used for head/tail pointers prefetch. It contains all the head/tail pointers and empty status flags for all the linked lists that have been prefetched. In this way, prefetch buffer 834 acts as a cache for the linked list and head/tail pointers. Due to the nature of out of order read and write sequences, the prefetch buffer 834 may contain stale data. Valid bits are implemented for the entries that can become stale and they will be invalidated when hit by cache updates from data out processor 832. Empty bits are implemented for tail pointers and can become stale. These can be updated by cache updates when hit. Prefetch buffer 834 is preferably implemented with registers because of the requirement of multiple reads (e.g., comparison if two entries are equal) in the same cycle.

By allowing the atomic read and write operations to be performed in a cache environment according to the above described out-of-order sequence, switch throughput is maximized from a linked list update point-of-view. Of course, those skilled in the art will appreciate that the preferred embodiment described herein is merely one example of the how the present invention may be implemented. Accordingly, the description and figures relating thereto should be regarded as illustrative only and the present invention should be limited only in terms of the claims which follow.

What is claimed is:

1. A method comprising:

mapping together in a predetermined order a number of memory accesses including memory reads and memory writes of multiple cell operations within a network switch so as to implement a desired sequence of the cell operations, which sequence accounts for data dependencies among the cell operations, the memory accesses being associated with cell move, cell arrival and cell departure operations, each having one or more memory get and/or put operations associated therewith; and performing said desired sequence of the cell operations.

2. A method as in claim 1 wherein the cell operations comprise updates to one or more linked lists that indicate cell storage locations.

3. A method as in claim 1 wherein each get and put operation includes a number of memory operations to update one or more linked lists that indicate cell storage locations.

4. A method as in claim 3 wherein the memory operations of the gets and puts comprise memory reads and memory writes and such memory operations are grouped so that all memory read operations associated with dependent ones of the operations are performed before all memory write operations associated with the dependent ones of the operations are performed.

5. A method comprising:

performing one or more update operations on a plurality of linked list pointers to produce a set of updated linked list pointers, the update operations being performed in response to update requests and comprising a series of dequeuing operations followed by a series of enqueuing operations, all of the dequeuing operations being performed prior to any of the enqueuing operations being performed; and storing said updated linked list pointers in a memory.

6. A method as in claim 5 wherein the update requests are associated with one or more Asynchronous Transfer Mode (ATM) connections and the linked list pointers are associated with ATM queues for the ATM connections.

7. A method as in claim 6 wherein the update operations are performed by:

reading a plurality of head pointers, tail pointers and intermediate pointers from the memory;

storing the plurality of head pointers, tail pointers and intermediate pointers in a cache circuit; and updating the plurality of head pointers, tail pointers and intermediate pointers to reflect the results of the cell operations specified by the update requests.

8. A digital switch, comprising:

a memory;

one or more linked lists of pointers stored in the memory, the pointers corresponding to memory locations of associated data; and a caching circuit coupled to the memory and configured to (a) receive one or more of the linked lists of pointers in response to a linked list update request, the linked list update request indicating an operation involving the data, (b) to generate updated linked lists of pointers according to the update request, and (c) to generate the updated linked lists of pointers by performing out-of-order update operations wherein all dequeuing operations are performed before any enqueuing operations are performed.

9. A digital switch as in claim 8 wherein the caching circuit is further configured to write the updated linked lists of pointers to the memory upon completion of the operation.

10. A digital switch as in claim 9 wherein the caching circuit comprises:

a buffer adapted to receive the linked lists of pointers from the memory;

an address processor coupled to the buffer and adapted to receive the update request, the address processor configured to generate read and write addresses for accessing the memory according to the update request; and a data processor coupled to the buffer and configured to perform the out-of-order update operations according to the update request.

11. A digital switch as in claim 10 wherein the data processor stores intermediate results of the update operations in the buffer.

12. A digital switch comprising:
means for mapping together in a predetermined order a number of memory accesses including memory reads and memory writes of multiple cell operations so as to implement a desired sequence of the cell operations, which sequence accounts for data dependencies among the cell operations, the memory accesses being associated with cell move, cell arrival and cell departure operations, each having one or more memory get and/or put operations associated therewith; and
means for performing said desired sequence of the cell operations.

13. The digital switch according to claim 12, wherein the cell operations comprise updates to one or more linked lists that indicate cell storage locations.

14. The digital switch according to claim 12, wherein each get and put operation includes a number of memory operations to update one or more linked lists that indicate cell storage locations.

15. The digital switch according to claim 14, wherein the memory operations of the gets and puts comprise memory reads and memory writes and such memory operations are grouped so that all memory read operations associated with dependent ones of the operations are performed before all memory write operations associated with the dependent ones of the operations are performed.

16. A digital switch comprising:
means for performing one or more update operations on a plurality of linked list pointers to produce a set of updated linked list pointers, the update operations being performed in response to update requests and comprising a series of dequeuing operations followed by a series of enqueuing operations, all of the dequeuing operations being performed prior to any of the enqueuing operations being performed; and
means for storing said updated linked list pointers in a memory.

17. The digital switch according to claim 16, wherein the update requests are associated with one or more Asynchronous Transfer Mode (ATM) connections and the linked list pointers are associated with ATM queues for the ATM connections.

18. The digital switch according to claim 17, further comprising:
means for reading a plurality of head pointers, tail pointers and intermediate pointers from the memory;
means for storing the plurality of head pointers, tail pointers and intermediate pointers in a cache circuit; and
means for updating the plurality of head pointers, tail pointers and intermediate pointers to reflect the results of the cell operations specified by the update requests.

19. A computer readable medium containing executable instructions which, when executed in a processing system, cause the system to perform a method comprising:
mapping together in a predetermined order a number of memory accesses including memory reads and memory writes of multiple cell operations within a network switch so as to implement a desired sequence of the cell operations, which sequence accounts for data dependencies among the cell operations, the memory accesses being associated with cell move, cell arrival and cell departure operations, each having one or more memory get and/or put operations associated therewith; and
performing said desired sequence of the cell operations.

20. The computer readable medium according to claim 19, wherein the cell operations comprise updates to one or more linked lists that indicate cell storage locations.

21. The computer readable medium according to claim 19, wherein each get and put operation includes a number of memory operations to update one or more linked lists that indicate cell storage locations.

22. The computer readable medium according to claim 21, wherein the memory operations of the gets and puts comprise memory reads and memory writes and such memory operations are grouped so that all memory read operations associated with dependent ones of the operations are performed before all memory write operations associated with the dependent ones of the operations are performed.

23. A computer readable medium containing executable instructions which, when executed in a processing system, cause the system to perform a method comprising:
performing one or more update operations on a plurality of linked list pointers to produce a set of updated linked list pointers, the update operations being performed in response to update requests and comprising a series of dequeuing operations followed by a series of enqueuing operations, all of the dequeuing operations being performed prior to any of the enqueuing operations being performed; and
storing said updated linked list pointers in a memory.

24. The computer readable medium according to claim 23, wherein the update requests are associated with one or more Asynchronous Transfer Mode (ATM) connections and the linked list pointers are associated with ATM queues for the ATM connections.

25. The computer readable medium according to claim 24, wherein said performing further comprises:
reading a plurality of head pointers, tail pointers and intermediate pointers from the memory;
storing the plurality of head pointers, tail pointers and intermediate pointers in a cache circuit; and
updating the plurality of head pointers, tail pointers and intermediate pointers to reflect the results of the cell operations specified by the update requests.

26. A digital switch comprising:
a memory; and
a processor coupled to the memory and configured to map together in a predetermined order a number of memory accesses including memory reads and memory writes of multiple cell operations so as to implement a desired sequence of the cell operations, which sequence accounts for data dependencies among the cell operations, the memory accesses being associated with cell move, cell arrival and cell departure operations, each having one or more memory get and/or put operations associated therewith, and to perform said desired sequence of the cell operations.

27. The digital switch according to claim 26, wherein the cell operations comprise updates to one or more linked lists that indicate cell storage locations.

28. The digital switch according to claim 26, wherein each get and put operation includes a number of memory operations to update one or more linked lists that indicate cell storage locations.

29. The digital switch according to claim 28, wherein the memory operations of the gets and puts comprise memory reads and memory writes and such memory operations are grouped so that all memory read operations associated with dependent ones of the operations are performed before all memory write operations associated with the dependent ones of the operations are performed.

30. A digital switch comprising:

a memory; and a processor coupled to the memory and configured to perform one or more update operations on a plurality of linked list pointers to produce a set of updated linked list pointers, the update operations being performed in response to update requests and comprising a series of dequeuing operations followed by a series of enqueuing operations, all of the dequeuing operations being performed prior to any of the enqueuing operations being performed, and to store said updated linked list pointers in a memory.

31. The digital switch according to claim 30, wherein the update requests are associated with one or more Asynchronous Transfer Mode (ATM) connections and the linked list pointers are associated with ATM queues for the ATM connections.

32. The digital switch according to claim 31, wherein said processor is further configured to:

read a plurality of head pointers, tail pointers and intermediate pointers from the memory;

store the plurality of head pointers, tail pointers and intermediate pointers in a cache circuit; and update the plurality of head pointers, tail pointers and intermediate pointers to reflect the results of the cell operations specified by the update requests.

* * * * *